United States Patent [19]

Meili

[11] Patent Number: 4,646,862
[45] Date of Patent: Mar. 3, 1987

[54] FLOOR CLEANING MACHINE

[75] Inventor: Hermann Meili, Münchwilen, Switzerland

[73] Assignee: Internationale Octropi, Rotterdam, Netherlands

[21] Appl. No.: 767,878

[22] Filed: Aug. 21, 1985

[30] Foreign Application Priority Data

Aug. 28, 1984 [GB] United Kingdom ................. 8421712

[51] Int. Cl.⁴ ............................................ B62D 51/04
[52] U.S. Cl. .................................. 180/19.3; 73/862.05
[58] Field of Search .................... 180/19.3, 19.2, 19.1, 180/65.1, 65.8, 315; 338/2; 323/352, 353; 73/862.05

[56] References Cited

U.S. PATENT DOCUMENTS 3,712,399  1/1973  Ruffle ............................. 180/65.1
3,818,292  6/1974  Berman ........................... 180/65.8
4,280,578  7/1981  Perkins ............................ 180/6.5

OTHER PUBLICATIONS

The Illustrated Dictionary of Electronics, 2nd Edition, TAB Books Inc., p. 389.
Hall Effect Transducers, Micro Switch, a Honeywell Division, pp. 7, 9, 15, 16, 17, 33, 163 & 176.
Dictionary of Electronics, Butterworths, pp. 134 & 135.
Principals of Electric Measurements, The English Universities Press Ltd., pp. 520 & 521.

Primary Examiner—John A. Pekar
Attorney, Agent, or Firm—Cushman, Darby & Cushman

[57] ABSTRACT

A floor cleaning machine having a speed control and steering member which operates under operator-applied deformation thereof. The invention provides improved consumer convenience at steering and speed control.

8 Claims, 3 Drawing Figures

FLOOR CLEANING MACHINE

BACKGROUND OF THE INVENTION

The present invention relates to floor cleaning machines and in particular to automatic floor cleaning and treating machines which are used for the cleaning of carpets and hard surfaces of large floor areas, such as in hotels, factories, office buildings, shopping centers and the like.

In general such machines comprise a movable body carrying a brushing means, reservoirs for storing fresh and spent cleaning liquid, means for dosing fresh cleaning liquid onto the floor and a squeegee/vacuum pick-up system for recovering spent cleaning liquid from the floor.

These machines are normally power-operated comprising a pair of driving wheels for moving the body, a motor for driving the wheels, and steering and speed control members for operating the driving motor. Steering may either be manual or by way of differentiated control of the individual wheel speeds.

The present invention now in particular relates to means for controlling speed and/or steering.

SUMMARY OF THE INVENTION

According to the invention there is provided a floor cleaning machine comprising a body, a pair of driving wheels for moving the body, an electric motor for driving the wheels, and a speed control member for controlling the operation of the driving motor, characterized in that the speed control member is deformable under operator-applied force and comprises a component which is capable of controlling the current through the driving motor as a function of operator-applied deformation of the member.

Preferably the machine comprises separate motors for each of the drive wheels and two speed control members for the individual operation thereof, the members each comprising a current-control component. In this arrangement simultaneous steering and speed control is established by differentiated deformation of the control members.

The current-control component may be any electric or electronic device suitable for the purpose. Preferably it comprises a Hall-element. A Hall-element is an electric device which is based on the Hall effect whereby a transverse electromotive force is produced in a current-carrying conductor or semi-conductor subjected to a magnetic field. Instead of the Hall-element it may also be advantageous to use a strain gauge (a deformation dependent resistance) in the control member. In general the deformation-sensitive component does not control the current of the driving motor in a direct way, but preferably is coupled and controls the amplifying circuit controlling the motor current.

An essential feature of the present invention is the ability of the speed control member to deform under an operator-applied force. To this purpose the speed control member preferably comprises two half-bar members positioned in line with one another, the current-control component mounted between and connecting the half-bar members. In this arrangement of the speed control member a pulling or pushing action on one or both free ends of the half-bars causes deformation of the component. In an alternative form the speed control member preferably comprises a one-piece bar manufactured from deformable resilient material, the component being attached to the surface of or incorporated into the middle of the bar such that deformation of the bar member causes deformation of the component. Speed control is achieved by a pulling or pushing action on the free bar ends.

Preferably, the speed control member further comprises a second rigid bar, parallel to the first deformable bar, the arrangement being such that the free ends of the first deformable bar are manually contractable to the second rigid bar for causing deformation of the first bar.

BRIEF DESCRIPTION OF THE DRAWINGS

The invention will now be further illustrated with reference to the accompanying drawings in which.

DETAILED DESCRIPTION OF THE PREFERRED EMBODIMENT

Figure 1:
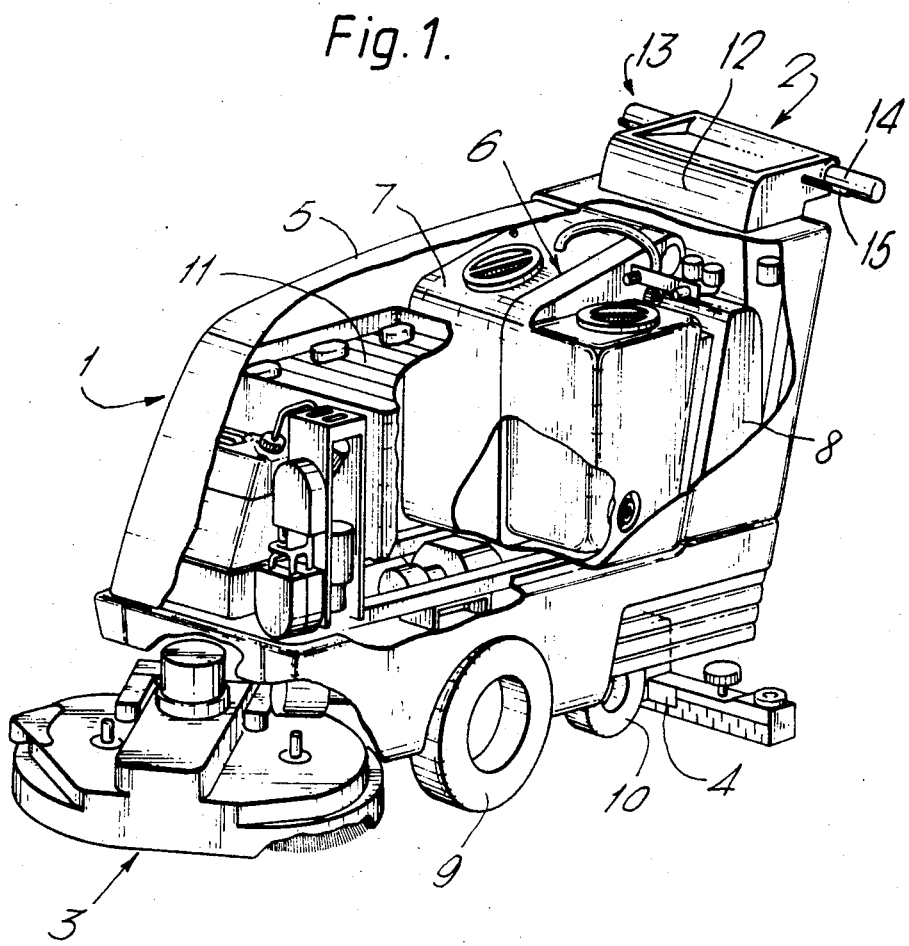
FIG. 1 is a perspective view of an automatic floor cleaning machine according to the present invention.
Figure 2:
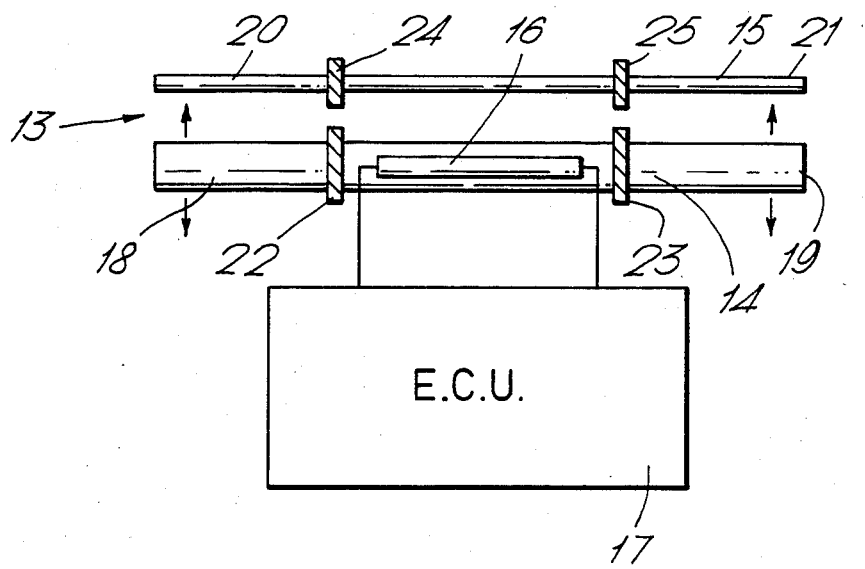
FIG. 2 is an enlarged view of a preferred embodiment of the speed control member according to the present invention.

Referring now to FIG. 1 an automatic floor cleaning machine is shown, comprising a housing or body (1), a steering and controlling means (2), a brushing means (3) and a squeegee (4). The body (1) has been drawn cut-open for illustration of the interior. It comprises a cover (5) for housing tank, battery, pump and motor parts. A storage tank (6) comprises a first reservoir (7) for storing fresh cleaning liquid and a second reservoir (8) for storing spent cleaning liquid. Although the two reservoirs may have a fixed separation wall, it is preferred that they are separated by way of a flexible membrane.

The cleaning machine is supported on main drive wheels (9) and one or more caster wheels (10). The driving motor means for wheels (9) is battery-operated enabling ready maneuverability over a wide area. Although the use of a battery (11) is preferred, if so desired the motors may also be energized from an external electrical source through a cord, thereby eliminating battery (11).

The steering and controlling means (2) comprises a cover (12) for housing the electronic control of the various machine functions, and a steering and speed control member (13) comprising a first deformable bar (14) and a second rigid bar (15). In the middle of the deformable bar (14) a current-control electric component (16) is incorporated, which is coupled to an electronic control unit (17) which controls the driving wheel motor means as a function of the voltage-output/resistance of the electrical component (16). Handles (14) and (15) are fixed to the machine body with securing rings (22, 23) and (24, 25) respectively. Rings (22, 23) are able to pivot with respect to the machine body allowing deformation of bar (14).

Preferred types of suitable deformation-sensitive electrical components are the Hall-element and the strain gauge.

The arrangement of bars (14) and (15) is such that deformation of bar (14) is established by manually contracting the outer ends (18,19) of bar (14) to the ends (20,21) of rigid bar (15). Due to the deformation of bar (14) the electric component (16) is deformed which results in a change of the voltage output (Hall-element)

or the resistance (strain gauge) of the electric component (16). This change is sensored by the electronic control unit (17) which controls on the basis thereof the current to the drive wheel motor means. In this way, a simple pushing (contracting) or pulling action on the free ends (18,19) of bar (14) results in a proportional forward or backward speed of the cleaning machine.

Figure 3:
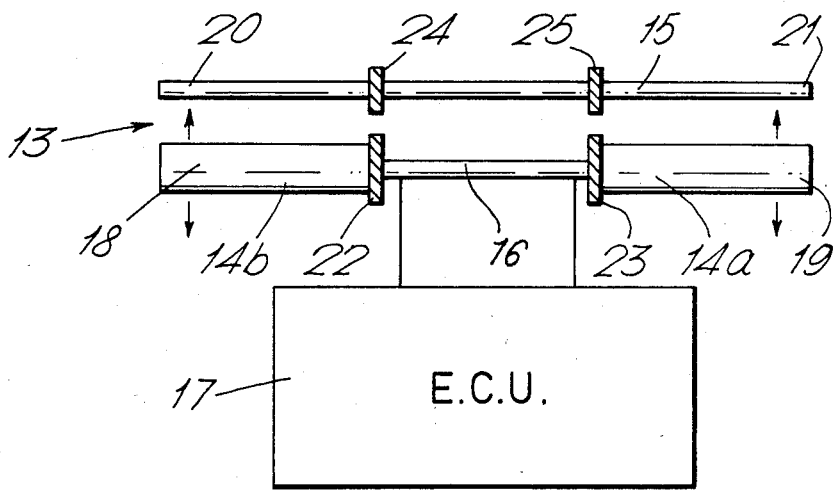
FIG. 3 is an enlarged view of an alternative preferred embodiment of the speed control member according to the present invention.

In an alternative arrangement (FIG. 3) the speed control member (13) comprises two half-bars (14a,14b) positioned in extension of each other, and the electrical component (16) mounted between and connecting the half-bars (14a,14b). A pulling or pushing action on one or both free ends (18,19) of the half-bar causes the electrical component (16) to deform.

In a further preferred embodiment the cleaning machine comprises separate motor means for each of the drive wheels. To achieve combined steering and speed control two current-control components are incorporated for individual control of each of the wheel motor means. To this purposes two separate bars or semi-bars are used each comprising one of the electrical control components. Suitably only a single bar may be used, in which arrangement the middle of the bar is rigidly attached to the machine body and the electrical control components are positioned on both sides of the middle of the bar. Simultaneous speed and steering control is achieved by a differentiated pushing or pulling action on the ends of the control member bar or half-bars.

I claim:

1. A floor cleaning machine comprising:
   a body;
   a pair of driving wheels for moving the body;
   an electric motor for driving the wheels; and
   a first speed control member for controlling the operation of the driving motor, said speed control member including a bar which is deformable under operator-applied force, said bar including a component which controls the current through said electric motor as a function of operator-applied deformation of the bar.

2. A floor cleaning machine according to claim 1, further including a second speed control member which is separate and independent from said first speed control member, each of the speed control members controlling a respective one of the driving wheels, each speed control member including a current-control component.

3. A floor cleaning machine according to claim 1, wherein the current-control component comprises a Hall-element.

4. A floor cleaning machine according to claim 1, wherein the current-control component comprises a deformation dependent resistance.

5. A floor cleaning machine according to claim 1, wherein said bar comprises two half-bar members positioned substantially in line with one another, the current-control component being mounted between and connecting the half-bar members, pulling or pushing on the distal ends of both half-bar members causing deformation of the current-control component.

6. A floor cleaning machine according to claim 1, wherein said bar comprises a one-piece bar member including a deformable resilient material, the current control component being attached to the surface of the bar member, deformation of the bar member causing deformation of the current-control component.

7. A floor cleaning machine according to claim 1, wherein the speed control member further comprises a rigid bar member arranged substantially parallel to said bar, distal ends said bar being adapted to be manually contractable in a direction toward said rigid bar member to cause deformation of said bar.

8. A floor cleaning machine according to claim 1 wherein said bar comprises a one-piece bar member including a deformable resilient material, the current-control component being incorporated into a middle of the bar member, deformation of the bar member causing deformation of the current-control component.

* * * * *